(12) United States Patent
Salisbury et al.

(10) Patent No.: US 10,537,998 B2
(45) Date of Patent: Jan. 21, 2020

(54) ROBOT GRIPPER

(71) Applicant: SRI INTERNATIONAL, Menlo Park, CA (US)

(72) Inventors: Curt Salisbury, San Ramon, CA (US); Mike Stevens, Menlo Park, CA (US); Zachery Shivers, San Francisco, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 15/990,388

(22) Filed: May 25, 2018

(65) Prior Publication Data
US 2018/0272541 A1 Sep. 27, 2018

Related U.S. Application Data

(63) Continuation of application No. PCT/US2016/064835, filed on Dec. 2, 2016.
(Continued)

(51) Int. Cl.
*B25J 15/00* (2006.01)
*B25J 13/08* (2006.01)
*B25J 15/02* (2006.01)

(52) U.S. Cl.
CPC ......... *B25J 13/085* (2013.01); *B25J 15/0009* (2013.01); *B25J 15/0233* (2013.01)

(58) Field of Classification Search
CPC ... B25J 15/0009; B25J 15/0233; B25J 13/085
See application file for complete search history.

(56) References Cited

U.S. PATENT DOCUMENTS 4,921,293 A * 5/1990 Ruoff ................ A61F 2/583
                                                     294/106
6,668,678 B1 * 12/2003 Baba ................ B25J 9/104
                                                     414/680
(Continued)

FOREIGN PATENT DOCUMENTS

JP        2004-223687 A      8/2004
JP        2004223687 A  *    8/2004
(Continued)

OTHER PUBLICATIONS

Korean Intellectual Property Office, "Written Opinion" in application No. PCT/US2016/064835, dated Aug. 25, 2017, 13 pages.
(Continued)

*Primary Examiner* — Gerald McClain
(74) *Attorney, Agent, or Firm* — Hickman Palermo Becker Bingham LLP; Christine E. Orich

(57) ABSTRACT

A compact lightweight robotic end-effector has a large range of possible applied force. The end-effector includes one or more underactuated appendages, where each appendage is driven by a single motor connected to a driving cable wound throughout the appendage. The driving cable may be a flat cable or a cable with another non-circular cross section. The driving cable may be wrapped through a series of pulleys and/or bearings within the appendage to reduce frictional losses. The design of the pulley path may allow a desired mechanical response by the appendage, and the mechanical response may be optimized for a grasping process.

24 Claims, 9 Drawing Sheets

Related U.S. Application Data

(60) Provisional application No. 62/262,446, filed on Dec. 3, 2015.

(56) References Cited

U.S. PATENT DOCUMENTS

| | | | | |
|---|---|---|---|---|
| 2014/0007730 A1* | 1/2014 | DeLouis | .............. | B25J 15/0009 74/490.03 |
| 2014/0035306 A1* | 2/2014 | Garcia | ................. | B25J 15/0009 294/213 |

FOREIGN PATENT DOCUMENTS

| | | | |
|---|---|---|---|
| JP | 2006-192523 A | | 7/2006 |
| JP | 2006192523 A | * | 7/2006 |
| JP | 2011-121162 A | | 6/2011 |
| WO | WO2017/116614 A3 | | 7/2017 |

OTHER PUBLICATIONS

Korean Intellectual Property Office, "Search Report" in application No. PCT/US2016/064835, dated Aug. 25, 2017, 3 pages.

* cited by examiner

Section AA'

Section AA'

Section CC'

Section CC'

ROBOT GRIPPER

CROSS-REFERENCE TO RELATED APPLICATIONS

This application is a continuation of PCT Patent Application No. PCT/US2016/064835, filed Dec. 2, 2016, which claims priority to U.S. Provisional Application No. 62/262,446, entitled ROBOT GRIPPER and filed on Dec. 3, 2015, the disclosures of each of which is hereby incorporated by reference in its entirety.

STATEMENT REGARDING FEDERALLY SPONSORED R&D

This invention was made with Government support under Government contract number W31P4Q-13-C-0046, awarded by the U.S. Army Contracting Command. The Government has certain rights in this invention.

BACKGROUND OF THE INVENTION

Field of the Invention

Embodiments described herein relate to robotic components and methods of controlling the same.

Description of the Related Art

The use of robotics to perform various tasks is becoming increasingly common. Robots are used in many areas including manufacturing, medicine, weapon systems and in the home. Robots come in many sizes, shapes and forms. Typically, robots have one or multiple arms, each arm having an end effector at the distal end of the arm. An end effector may be thought of as a mechanical or an electro-mechanical device that can perform various tasks as grasping, scooping, sorting and moving. As robots interact with its environment, in some cases entirely through the end effectors, the utility of a robot is realized through the design and the capability of its end effectors.

SUMMARY OF THE INVENTION

In one embodiment, a robotic end-effector is provided, including a base, a first appendage extending from the base, the first appendage including a first appendage link coupled to the housing at a first joint, a first joint pulley rotationally coupled to the first joint, the first joint pulley including an contact section having a first outer diameter, a second appendage link coupled to the first appendage link by a second joint, a second joint pulley rotationally coupled to the second joint, the second joint pulley including a contact section having a second outer diameter different than the first outer diameter of the contact section of the first joint pulley, a motor disposed within the base, a hub disposed within the base and rotationally coupled to the motor, and a driving cable coupled to the hub at a first end and coupled to the first appendage at a second end, the driving cable in contact with the contact sections of the first joint pulley and the second joint pulley such that rotation of the hub alters the tension in the driving cable and induces rotation of at least one of the first or second appendage links.

The end-effector may additionally include a first intermediate pulley disposed within the first appendage link and between the first and second joint pulleys, where the driving cable is wound in order along alternating sides of the first joint pulley, first intermediate pulley, and second joint pulley. The end-effector may additionally include a return cable secured at a first end within the base and at a second end within the first appendage, where the return cable is wound in order around alternating sides of the first joint pulley, first intermediate pulley, and second joint pulley on the opposite side as the driving cable. The first joint pulley may be supported by a pair of angular bearings, and where the first intermediate pulley is supported by a needle bearing.

The first appendage may further include a third appendage link coupled to the second appendage link by a third joint, and a third joint pulley rotationally coupled to the third joint, the third joint pulley including a contact section having a third outer diameter different than the first outer diameter of the exterior contact section of the first joint pulley and the second outer diameter of the exterior contact section of the second joint pulley, where the driving cable is in contact with the contact area of the third joint pulley.

The end-effector may additionally include a second appendage extending from the base, the second appendage including a first appendage link coupled to the housing at a first joint, a first joint pulley rotationally coupled to the first joint, the first joint pulley including an contact section having a first outer diameter, a second appendage link coupled to the first appendage link by a second joint, a second joint pulley rotationally coupled to the second joint, the second joint pulley including a contact section having a second outer diameter different than the first outer diameter of the contact section of the first joint pulley, a motor disposed within the base, a hub disposed within the base and rotationally coupled to the motor, and a second driving cable coupled to the second hub at a first end and coupled to the first appendage at a second end, the driving cable in contact with the contact sections of the first joint pulley and the second joint pulley of the second appendage such that rotation of the second hub alters the tension in the second driving cable and induces rotation of at least one of the first or second appendage links of the second appendage.

The driving cable may have a non-circular cross section. The driving cable may be wound at least one complete rotation about the hub. The driving cable may be capable of bearing a tensile load of at least 50 $lb_f$ or at least 150 $lb_f$. The driving cable may include a material having a self-support length of at least 50 km.

The end-effector may additionally include a position sensor located adjacent the first joint, where the first joint includes a first pin configured to engage the position sensor. The end-effector may additionally include a tension sensing structure biased against a portion of the driving cable extending between the hub and the first joint, where the position of the portion of the tension sensing structure in contact with the driving cable is dependent upon the tension in the driving cable.

In one embodiment, a robotic finger assembly is provided, including a proximal appendage link configured to rotate about a first joint, a first joint pulley coupled to the first joint and having a first outer diameter, a distal appendage link coupled to the proximal link by a second joint, a second joint pulley coupled to the first joint and having a second outer diameter different than the first outer diameter of the first joint pulley, a motor, and a driving cable coupled to the motor and in contact with the contact sections of the first joint pulley and the second joint pulley such that rotation of the hub alters the tension in the driving cable and induces rotation of at least one of the first or second appendage links, the driving cable having a non-circular cross section.

The assembly may additionally include a hub coupled to the motor, where a first end of the driving cable is frictionally retained within the hub, and where the driving cable is wrapped at least one full revolution around the circumference of the hub. The assembly may additionally include a load sensor, and a sensor pulley coupled to the load sensor and in contact with the driving cable, where changes in the tension of the driving cable induce deflection of the sensor pulley. The assembly may additionally include an absolute position sensor disposed adjacent each of the first joint and the second joint. The assembly may additionally include a return cable extending from a return spring and through at least the first and second appendage links, the return cable extending along the opposite sides of the first and second joint pulleys of the driving cable.

In one embodiment, a robotic hand end-effector is provided, including a base, a plurality of underactuated appendages, each underactuated appendage including a plurality of appendage segments, each appendage segment configured to rotate relative to a joint located at the proximal end of the appendage segment, a plurality of motors disposed within the base, and a plurality of driving cables, each driving cable connected to a motor and routed through the plurality of appendage segments of an underactuated appendage and configured to induce rotation of each of the plurality of appendage segments in response to a change in tension of the driving cable.

Each joint in an underactuated appendage may be coupled to a joint pulley, the diameter of the joint pulleys in an underactuated appendage decreasing with increased distance from the base. The underactuated appendages may include a proximal appendage segment connected to the base by a first joint coupled to a first joint pulley having a first diameter, a medial appendage segment connected to the proximal appendage segment by a second joint coupled to a second joint pulley having a second diameter smaller than the first diameter of the first joint pulley, and a distal appendage segment connected to the medial appendage segment by a third joint coupled to a third joint pulley having a third diameter smaller than the second diameter of the second joint pulley The end-effector may additionally include a first needle bearing disposed within the proximal appendage segment, and a second needle bearing disposed within the medial appendage segment. The driving cable is wound in a serpentine manner past, in turn, the first joint pulley, the first needle bearing, the second joint pulley, the second needle bearing, and the third joint pulley, and where the distal end of the driving cable is secured within the distal appendage segment.

DETAILED DESCRIPTION OF THE PREFERRED EMBODIMENT

A robot designed for a very specific task or a specific set of tasks leads to a specific design of an end effector. Broadening the capabilities of the robot may lead to design compromises such as increased size or weight or cost. In many robots, the end effector may be shaped like a human hand to increase versatility in typical environments. To increase the versatility, the hand end effector may be designed to have a large range of grasping force so it can interact with delicate objects without destroying them in addition to interacting with heavy objects without damaging itself. In addition to having a wide range of possible grasping force, the hand end effector can also be made compact and lightweight. The hand end effector can also be made durable, to prevent or minimize damage upon impact of the hand end effector with another object.

A compact, lightweight hand end effector that has a large range of load carrying capacity can provide significant benefits. The use of such a compact and lightweight end effector may significantly relax the design requirements of a robotic arm to which it is mounted, which in turn may relax the design requirements of the entire robot. As an example, a heavier end effector requires an appropriately heavy and strong arm to accommodate the weight of the end effector. Conversely, a lighter end effector may lead to a smaller more compact arm which may itself lead to the smaller and compact overall design of the robot.

In some embodiments, an appendage such as a finger of a robotic end effector can be an underactuated system, driven by a single motor configured to induce a desired amount of tension in a single driving cable. Through design of the driving cable and the appendage components through which the driving cable is wound, a defined mechanical response can be provided in response to the tensioning of the driving cable. The appendage may include a high torque producing arrangement to provide a wide range of possible grasping force, with the upper limit of the grasping force range at least an order of magnitude above the grasping force of a human hand. A series of pulleys can be used to transmit the torque from the driving mechanism to the links of the appendage, reducing unnecessary frictional forces within the underactuated system.

Figure 1:
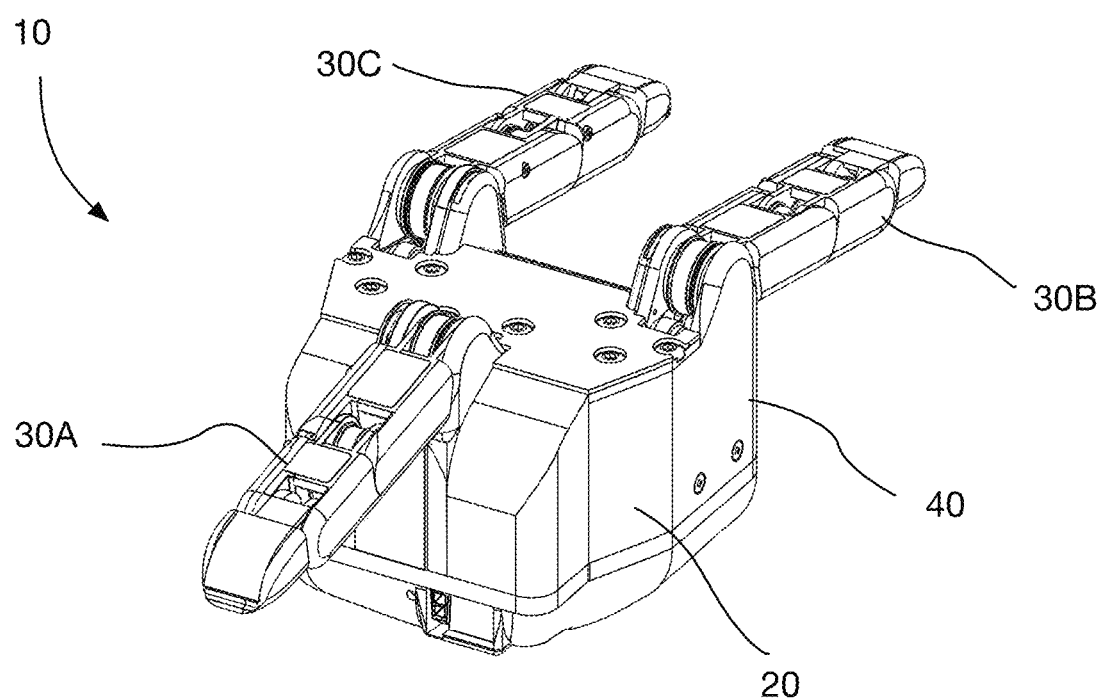
FIG. 1 is a perspective view of an embodiment of an embodiment of a hand end effector.

FIG. 1 is a perspective view of an embodiment of an embodiment of a hand end effector. The hand end effector 10 can provide a compact and lightweight hand end effector having a large range of grasping force. In the illustrated embodiment, the hand end effector 10 includes three fingers 30A, 30B, and 30C, supported by a base assembly 20. In other embodiments, more or fewer fingers may be coupled to a given base assembly.

Due to the wide range of possible grasping force which the hand end effector 10 can apply, among other features, the hand end effector 10 may be used to interact with both delicate and heavy objects. As discussed in greater detail below, each finger 30A, 30B, and 30C of the hand effector 10 may include some or all of a high-torque driving mechanism which may include a transmission to modulate the force applied by the finger, a position control system, and sensors such as position and load sensors. In some embodiments, as will be discussed in greater detail below, the fingers may provide multiple articulation points within a plane of movement. In the illustrated embodiment, the planes of movement of each of the fingers 30A, 30B, and 30C are generally parallel to one another, but in other embodiments at least some of the fingers may have a plane of movement which is oriented at an angle to a plane of movement of another finger. In other embodiments, some or all of the fingers may be movable to change the orientation of their planes of movement, allowing abduction and adduction movements to be performed.

In some embodiments, the fingers may be modular components, and each finger 30A, 30B, and 30C may have similar or even identical design and construction. Variations between the design and construction of the fingers may result from the placement of the fingers on or within the base assembly. For example, certain components which control the operation of the fingers 30A, 30B, and 30C are disposed within the base assembly 30. In order to provide a compact base assembly, certain components associated with those fingers may be disposed within the base assembly 20 and at least partially laterally offset from the plane of movement of the fingers 30A, 30B, and 30C. In some embodiments, the laterally offset components within the base assembly 30 associated with outer edge fingers 30B and 30C may be disposed on the inward side of the planes of movement of the fingers 30B and 30C, although any suitable arrangement may be provided, and the design of the base assembly 20 adjusted as desired to accommodate a given arrangement.

Along with the components associated with each finger 30A, 30B, and 30C, the base assembly may have additional components including but not limited to an overall control system, electronics, power supply and communication ports. Additional detail is provided elsewhere herein.

Figure 2:
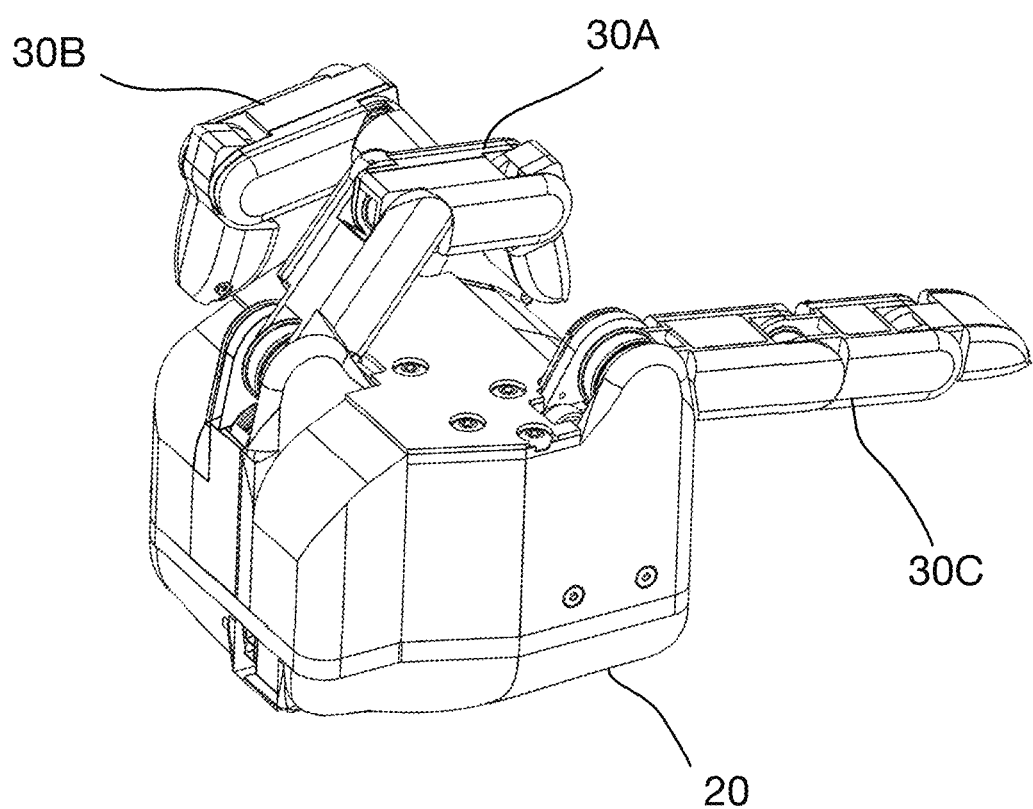
FIG. 2 is a perspective view of the hand end effector of FIG. 1 with two of the three fingers actuated.

FIG. 2 is a perspective view of the hand end effector of FIG. 1 with two of the three fingers actuated. In FIG. 2, fingers 30A and 30B are shown folded inward toward the base assembly 20, Finger 30C is shown in a straight unactuated position in which the links of the finger extend away from the base assembly 20. Due to the facing orientation of fingers 30A and 30B located on opposite sides of the base assembly 20, the fingers 30A and 30B fold inward in opposite directions upon actuation. Such a configuration may be used to clutch an object using fingers 30A and 30B, while finger 30C need not used in the clutching action. As fingers 30A, 30B, and 30C may be independently controllable, any combination of FIGS. 30A, 30B, and 30C may be actuated, and the amount of actuation may also vary between fingers.

In addition to independent motion control, each finger 30A, 30B, and 30C may have an independent force control system. By independently controlling the magnitude of the force applied by each finger, a wide variety of actions may be performed by hand end effector 10. For example, if the hand end effector 10 is used to turn an object such as a steering wheel by grasping the rim of the wheel, all or a portion of the fingers may initially grasp the wheel with a similar amount of force. However, as the wheel turns, each finger may progressively loosen its grip to accommodate the turn of the wheel. Independent control of each finger and independent measurement of the force each finger experiences provides the hand end effector 10 with this type of dexterity.

Figure 3A:
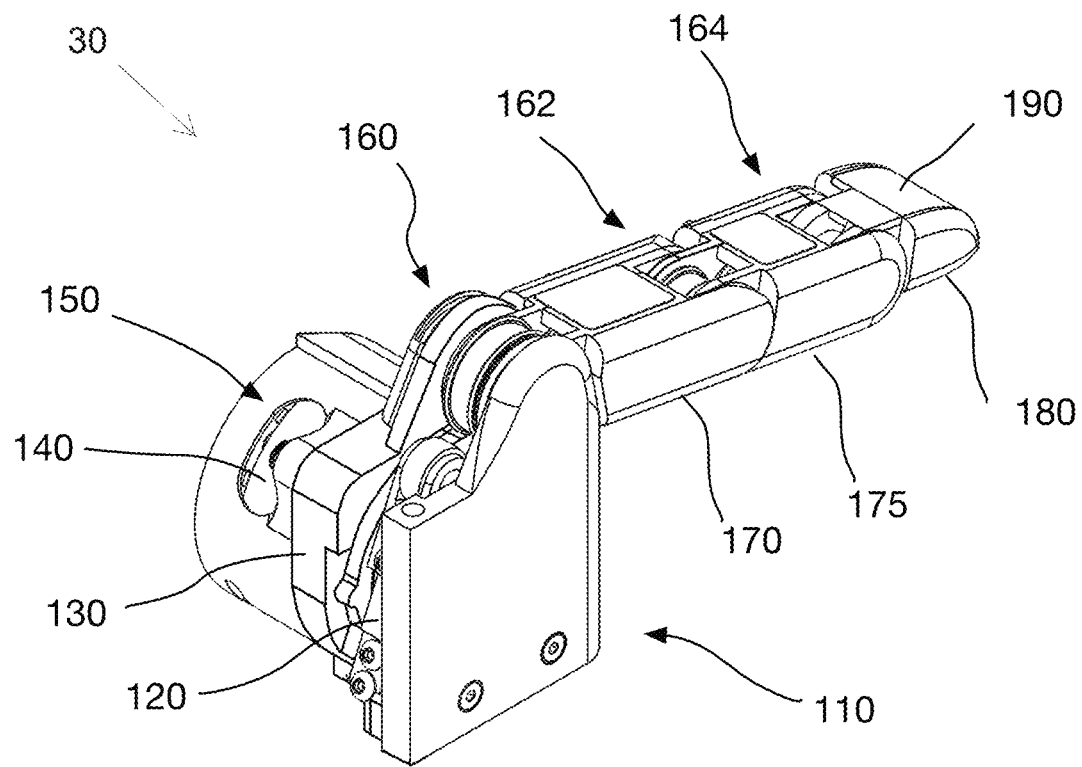
FIG. 3A is a perspective view of an exemplary finger assembly, such as the finger assemblies of the hand end effector of FIG. 1.

FIG. 3A is a perspective view of an exemplary finger assembly, such as the finger assemblies of the hand end effector of FIG. 1. The finger assembly 30 includes a finger base 110 and multiple links. In the illustrated embodiment, the finger assembly 30 includes three links: a proximal link 170, a medial link 175 and a distal link 180, are illustrated. The proximal end of each of these links 170, 175, and 180 may be coupled to a pin that, along with bearings, forms a joint. In FIG. 3A, the locations of the joints formed by the pins and bearings are shown by arrows 160, 162 and 164, respectively.

Figure 3B:
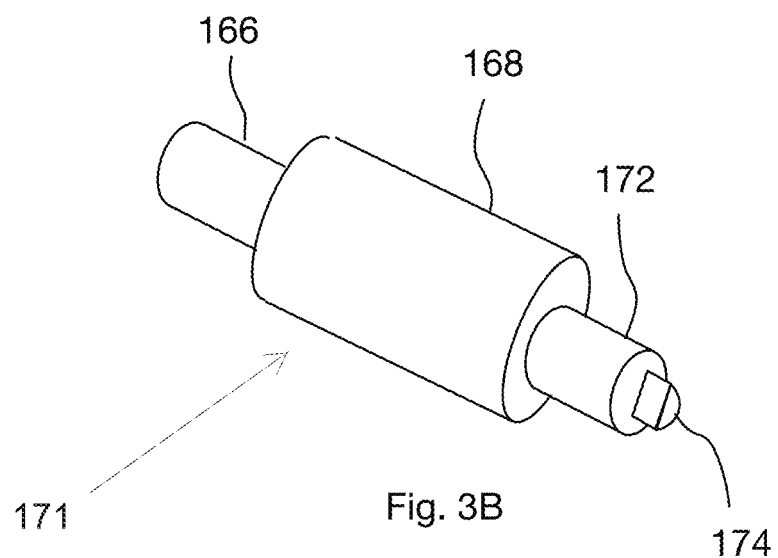
FIG. 3B is a perspective view of the pins used in the joints of the finger assembly of FIG. 3A.

FIG. 3B is a perspective view of the pins used in the joints of the finger assembly of FIG. 3A. The general shape of the illustrated embodiment of pin 161 can be seen in FIG. 3B. In some embodiments, the pin 161 may have two shoulder sections 166 and 172 and a wide central section 168, as shown. Bearings may be placed between the shoulder sections 166 and 172 and the housing of the finger assembly which may then allow the pin to rotate in relation to the housing. As discussed in greater detail below, the bearings between the shoulder sections 166 and 172 and the housing or other structural components of the figure may be angular bearings.

At least one of the shoulder sections 166 may include a portion having a non-circular cross-section. In the illustrated embodiment, the portion having a non-circular cross-section takes the form of a non-cylindrical projection 174 extending from the outer end of the shoulder section 172, although other shapes and locations of the portion having a non-circular cross-section may also be used. As discussed in greater detail elsewhere herein, the non-cylindrical projection 174 may interact with a position sensor to provide information regarding the position of the associated joint.

As also depicted in FIG. 3A, the base of the finger assembly 30 may contain a driving mechanism for actuating the finger assembly 30. In some embodiments, the driving mechanism may comprise a motor 140 coupled to a torque-generating component. In one particular embodiment, the motor 140 may comprise a brushless DC motor, and the torque-generating component 130 may comprise a high gear ratio, high torque producing component such as a harmonic drive or similar structure. Other mechanisms may also be used in other embodiments.

The combination of the use of a brushless DC motor and a harmonic drive creates a compact package which can provide a high ratio of grasping force to weight, whether measured as the weight of the finger assembly or the entire hand end effector. In one embodiment, the weight of the hand end effector such as the hand end effector of FIG. 1 may be 2 kg and each finger may have a grasping force of about 100 lb$_f$. In an embodiment in which the hand end effector includes three fingers, the total grasping force when all three fingers are actuated may be as high as 300 lb$_f$. In contrast, a typical human finger may grasp about 12 lb$_f$, and a typical on-market system may weigh 2 kg and exhibit a grasping force of about 45 lb$_f$. The use of a brushless DC motor and a harmonic drive can provide a maximum grasping force an order of magnitude higher than a human hand or typical on-market systems.

As can also be seen in FIG. 3A, the finger base may also include other components such as one or more Hall effect sensors 150 and a load sensor 120. The Hall effect sensors 150 can be used along with a motor controller control the speed and direction of the motor 140. The load sensor 120 can be used in the control of the finger assembly 30 as discussed in greater detail elsewhere herein.

Figure 4A:
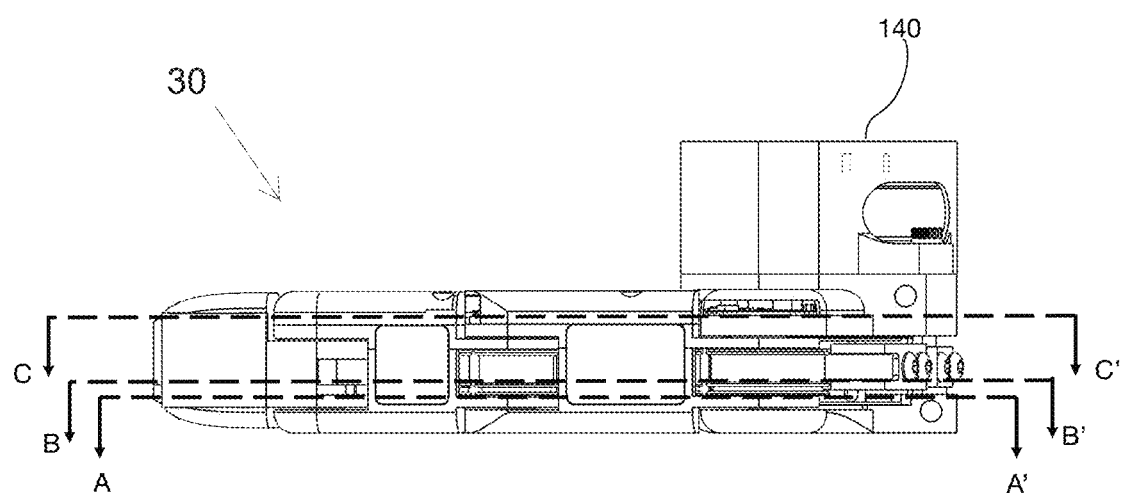
FIG. 4A is a top plan view of a finger assembly similar to the finger assembly of FIG. 3.
Figure 4B:
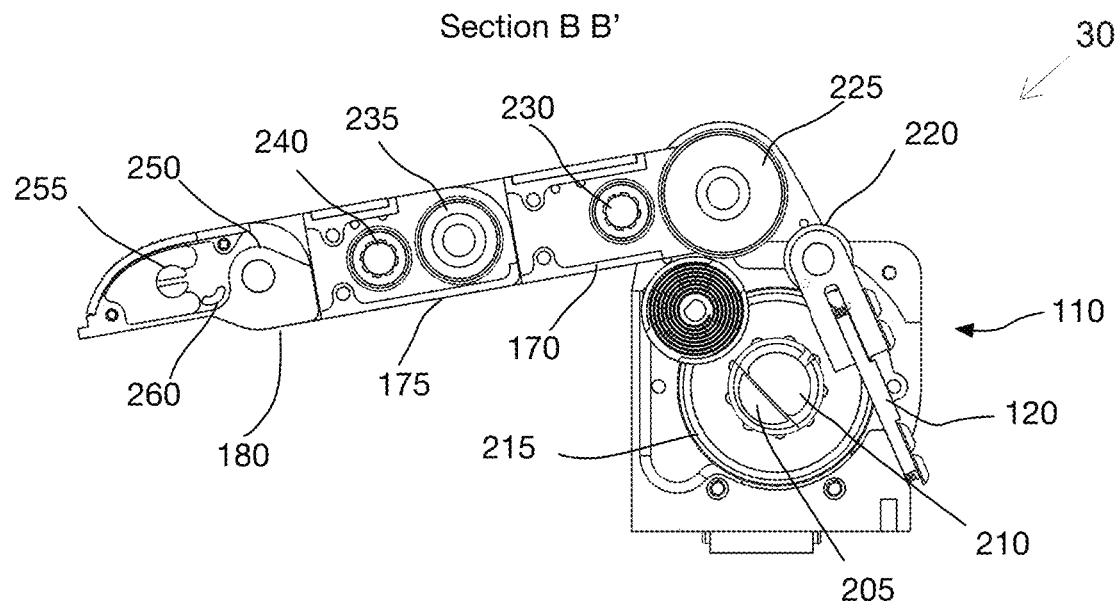
FIG. 4B is a side cross-sectional view of the finger assembly of FIG. 4A taken along the plane B-B', shown without a driving cable installed.
Figure 4C:
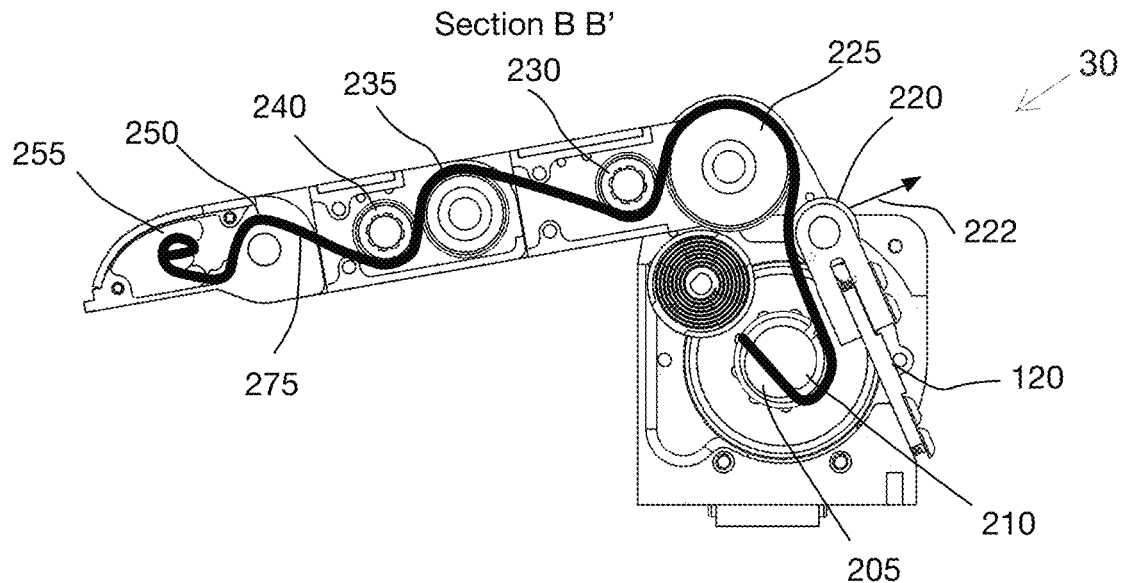
FIG. 4C is a side cross-sectional view of the finger assembly of FIG. 4C taken along the plane B-B', shown with a driving cable installed.

FIG. 4A is a top plan view of a finger assembly similar to the finger assembly of FIG. 3. FIG. 4B is a side cross-sectional view of the finger assembly of FIG. 4A taken along the plane B-B', shown without a driving cable installed. FIG. 4C is a side cross-sectional view of the finger assembly of FIG. 4A taken along the plane B-B', shown with a driving cable installed.

FIG. 4B illustrates various mechanisms disposed throughout the finger base 110 and the links 170, 175, and 180 which can be used in articulation of the finger 30. FIG. 4C illustrates the path through which a driving cable 275 is run between these mechanisms to enable articulation of the finger through tensioning of the driving cable 275.

The cable 275 may be a high strength cable able to withstand high tension forces. In some embodiments, the cable 275 may be a flat cable, but in other embodiments cables with round or other cross-sections may also be used. The use of a flat cable or a cable with a non-circular cross-section can be used to decrease the thickness of the finger assembly, as the routing of a thicker cable through the finger assembly will require additional clearance, increasing the size of the finger assembly.

Because the driving cable 275 can be subjected to high tensile loads, the driving cable 275 may include a material capable of bearing high tensile loads without significant deformation. In some embodiments, the driving cable may include a non-metallic material such as VECTRAN™, a multifilament yarn spun from liquid crystal polymer and commercially available from Kuraray America Inc. In some embodiments, the driving cable may include a flat braided cable including VECTRAN™ or a similar material. In some particular embodiments, the driving cable may have a width of roughly 9-10 mm, a thickness of roughly 1 mm, and may include 6 or 7 woven VECTRAN fibers. However, these dimensions are only exemplary, and a wide range of other dimensions and compositions may also be used in other embodiments.

Other suitable materials may be used in other embodiments, and may be chosen based upon features such as their tensile strength, weight, and resistance to creep and abrasion. Any material which offers sufficiently high tensile strength may be used, and in particular embodiments, materials with a high strength-to-weight ratio may be used. Some VECTRAN™ material has a self-support length or breaking length of more than 79 km, and some particular VECTRAN™ material has a self-support length of more than 200 km. In comparison, the self-support length of titanium is 29 km. In some embodiments, materials with a self-support length greater than 30 km, 50 km, 75 km, or 200 km may be used. In some embodiments, the material of the driving cable may be selected based on the strength alone, and the weight may be less important. In some embodiments, the tensile strength of VECTRAN™ material can be greater than 1 GPa, and some particular VECTRAN™ material may be greater than 3 GPa. In some embodiments, the tensile strength of the cable material may be greater than 1 GPa, 2 GPa, or 3 GPa. In some embodiments, the driving cable may be designed to bear a tensile load of at least 50 lb$_f$, while in other embodiments the driving cable may be designed to bear a tensile load of at least 100 lb$_f$, 150 lb$_f$, 200 lb$_f$, 300 lb$_f$, 400 lb$_f$, 500 lb$_f$, or higher.

As can be seen in FIG. 4B, the finger base includes a hub 210 and a hub cap 205 comprising facing surfaces. As can be seen in FIG. 4C, a portion of the cable 275 at or near the proximal end of the cable 275 is secured between the facing surfaces of the hub 210 and the hub cap 205. Screws or other fasteners may be used to clamp the hub cap 205 to the hub 210, securing the retained portion of the cable 275 therebetween.

Figure 4D:
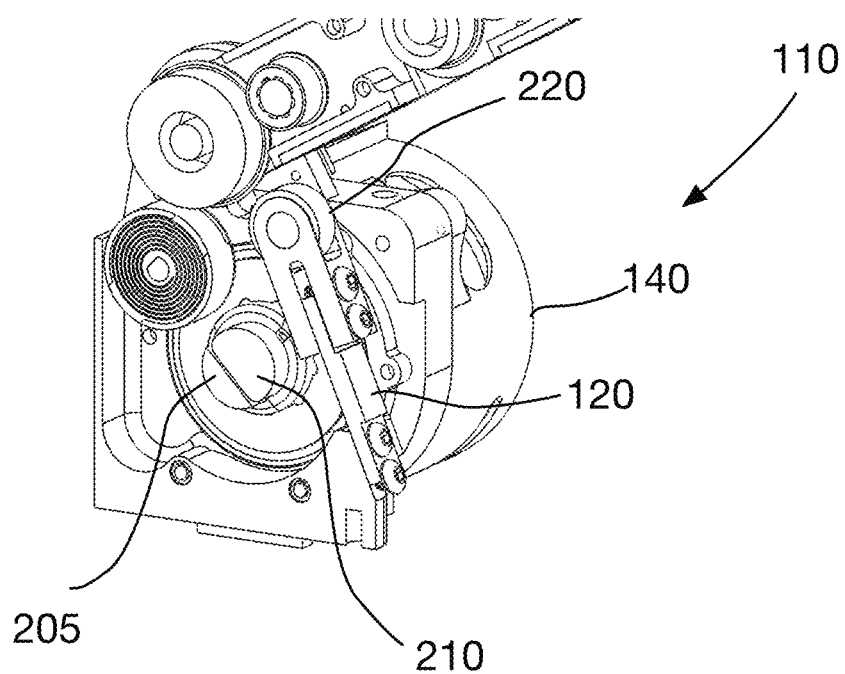
FIG. 4D is a perspective detailed cross-sectional view of the finger base of the finger assembly of FIG. 4A.
Figure 4E:
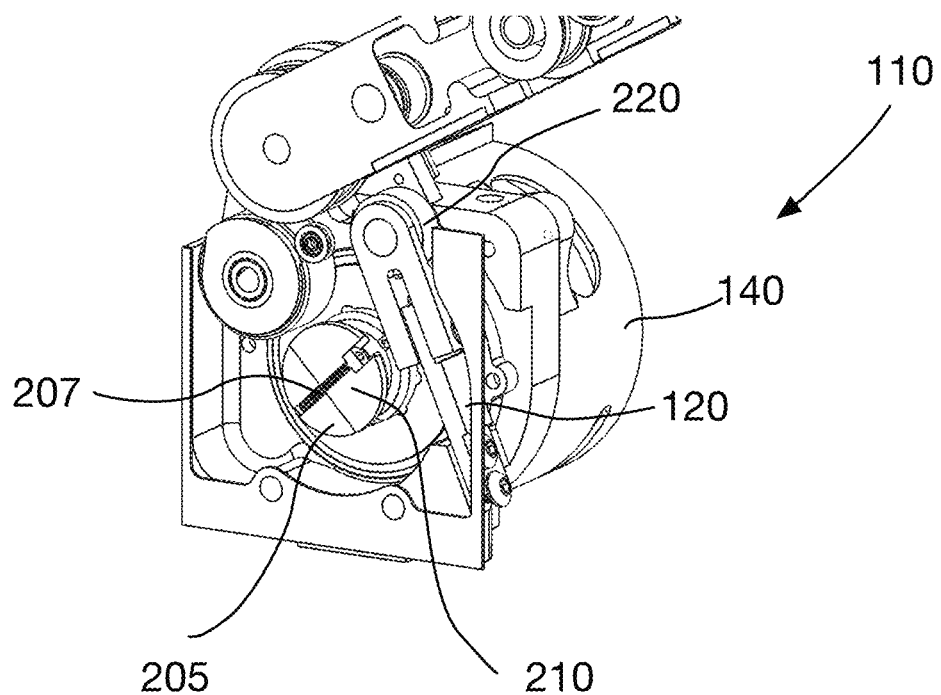
FIG. 4E is another perspective detailed cross-sectional view of the finger base of the finger assembly of FIG. 4A, taken along a different cross-sectional plane than the perspective detailed cross-sectional view of FIG. 4D.

FIG. 4D is a perspective detailed cross-sectional view of the finger base of the finger assembly of FIG. 4A. FIG. 4E is another perspective detailed cross-sectional view of the finger base of the finger assembly of FIG. 4A, taken along a different cross-sectional plane than the perspective detailed cross-sectional view of FIG. 4D. As can be seen in FIG. 4E, a screw 207 extending through portions of the hub cap 205 and hub 210 can be used to secure the hub cap 205 in place relative to the hub 210. The driving cable 275 may be held in place at least in part via frictional fit between the facing surfaces of the hub cap 205 and hub 210, or via any other suitable securement method.

In some embodiments, hub 210 may be coupled to the axle of the brushless DC motor while hub cap 215 may be a separate piece which may be clamped to the hub 210 as shown in FIG. 4E. Thus by positioning the driving cable 275 between the cap and the hub and by clamping the cap to the hub by means of screws, the driving cable 275 may be terminated.

In addition to clamping the driving cable 275 between the cap 205 and the hub 210, the cable may be wrapped one or multiple times around the combined outer diameter of the cap 205 and the hub 210. The multiple wraps increase the holding force in the cable due to the capstan effect. The increase in holding force in the cable provided by one or multiple wraps of the driving cable 275 can retain the end of the driving cable 275 in place even under very high loading. In addition, in embodiments in which the driving cable 275 is a flat cable, the multiple wraps of the cable can be made more stable, and the increased surface area of the cable wraps in contact with one another due to the width of the cable can further increase the holding force retaining the end of the driving cable 275.

The combined outer diameter of the hub 210 and the cap 205, as well as the number of wraps of the cable around the hub 210 and cap 205, may be chosen to achieve the appropriate range of motion of the finger given the speed of the motor.

As can be seen in FIGS. 4B-4C, the hub 210 may be located within a race bearing 215. By disposing the hub 210 within the race bearing 215, movement of the hub due to radial loads applied by the flat cable may be minimized or eliminated. The cable 215 passes from the hub 210 and adjacent a pulley 220 which may be coupled to a load sensor 120. FIGS. 4D-4E show the pulley 220 and the load sensor 120 in perspective. The cable 275 may make contact with the pulley 220 such that it may deflect the position of the pulley 220 from a nominal position in relation, where the deflection of the pulley 220 is dependent upon the tension in the cable 275.

In one embodiment, the nominal position of the pulley 220 may be defined as the position where the force on the load sensor 120 is zero or close to zero. Such a position is illustrated in FIG. 4C. The cable may still be making contact with the pulley 220 even in this nominal position but exerts zero or minimal force on the pulley. As the tension on the cable is increased, the cable exerts a force on pulley 220 in the direction of the arrow 222. Thus the load sensor, which may be coupled to the pulley 220, experiences this force and measures the tension of the flat cable.

As can be seen in FIG. 4B, the proximal link 170 includes a pulley 225 positioned at the joint between the proximal link 170 and the finger base 110, and a pulley 230 disposed within the proximal link 170 housing distal the pulley 225. In some embodiments, the pulley 225 may be coupled to the wide central portion 178 of a pin 171, and the shoulder sections 166 and 172 of the pin 171 may be coupled to angular bearings which are in turn coupled to the housing of the finger assembly 30. The pulley 230 may be a needle bearing coupled to the housing of the finger assembly 30, or may be coupled to a needle bearing coupled to the housing of the finger assembly 30.

As can be seen in FIG. 3A, FIG. 4A, and FIG. 4D, among others, the pulley 225 and other pulleys may include a central contact area where the driving cable 275 can make contact with the pulley, surrounded by a slight lip or ridge on either side of the central contact area. When the central contact area of the pulley 225 has a width which is similar to the width of the driving cable 275, the depression of the central contact area surrounded by radially-extending lips on either side of the central contact area can help to retain the driving cable 275 in place against the pulley 225. The central contact area can be a generally cylindrical shape having a first cross-sectional diameter, and the cross-sectional diameter of the pulley 225 on either side of the central contact area can be larger than the cross-sectional diameter of the central contact area. Although described as a central contact area, the lips on either side of the pulley 225 need not be the same width, and the contact area need not be centered at the midpoint of the width of the pulley 225.

Similarly, the medial link 175 includes a pulley 235 positioned at the joint between the medial link 175 and the proximal link 170, and a pulley 240 disposed within the medial link 170 housing distal the pulley 235. Like pulley 225, the pulley 235 may be may be coupled to the wide central portion 178 of a pin 171, and the shoulder sections 166 and 172 of the pin 171 may be coupled to angular bearings which are in turn coupled to the housing of the finger assembly 30. Like pulley 220, pulley 230 may be a needle bearing coupled to the housing of the finger assembly 30, or may be coupled to a needle bearing coupled to the housing of the finger assembly 30. The outer surfaces of some or all of the pulleys 230, 235, and 240 may have contact areas having a smaller cross-sectional diameter than lips on either side of the contact areas.

The angular bearings will tolerate both radial loads that act radially outwards from the rotational axis, and axial loads that act along the rotational axis. The needle bearings will tolerate high radial loads only, and cannot provide substantial resistance against axial loading. The combination of angular and needle bearings allows the finger and each of the links to tolerate both radial loading and axial loading. In certain embodiments similar to the illustrated example, the finger assembly can withstand 50 lbs. of lateral force and 100 lbs. of radial force, due to the combination of angular bearings and needle bearings. The resistance to lateral loading provided by the angular bearings may be useful when the hand end effector or other end-effector is oriented such that the weight of a grasped object creates lateral loading. In addition, the resistance to lateral loading can prevent damage done to the finger assembly 30 if the hand end effector strikes the ground or another object, increasing the durability of the hand end effector.

The distal link 180 includes at least a pair of curved features 250 and 260, as well as a cable terminating feature 255. The proximal curved feature 250 is located between the distal curved feature 260 and the pulley 240 in the medial link 175. The radius of curvature of a portion of the proximal curved feature is larger than the radius of curvature of the distal curved feature 260, but in the illustrated embodiment is smaller than the radius of curvature of pulley 235.

As can be seen in FIG. 4C, the cable 275 is routed from hub 210, against pulley 220 and around a portion of pulley 225. The cable 275 is then routed within the proximal link 170 around a portion of pulley 230. The cable 275 is routed on a side of pulley 270 generally opposite the side of pulley 225 along which the cable 275 was routed. The cable 275 is then routed around a portion of pulley 235 and routed within the medial link 175 around a portion of pulley 240. The cable 275 is then routed along a portion of proximal curved feature 250 and a portion of distal curved feature 260 before reaching and terminating at the terminating feature 255.

Distal curved feature 260 and terminating feature 255 may both be part of the structure of the distal link 180. The curvature of the features within the distal link, along with the cable routing path, minimizes or eliminates situations where the cable is slack in the distal link. The termination at terminating feature 255 at the distal link 180 may in some embodiments be achieved by wrapping the cable 275 multiple times around the feature 255. The multiple wrapping increases the clamping force due to the capstan effect. In some embodiments, due to the smaller size of the feature 255 relative to the hub 210, a greater number of wraps may be used around the feature 255 than around the hub 210. Other methods to terminate the cable 275 or secure a portion of the cable 275 to the terminating feature 255 or another feature within or coupled to the housing of distal link 180 may also be utilized.

Figure 4F:
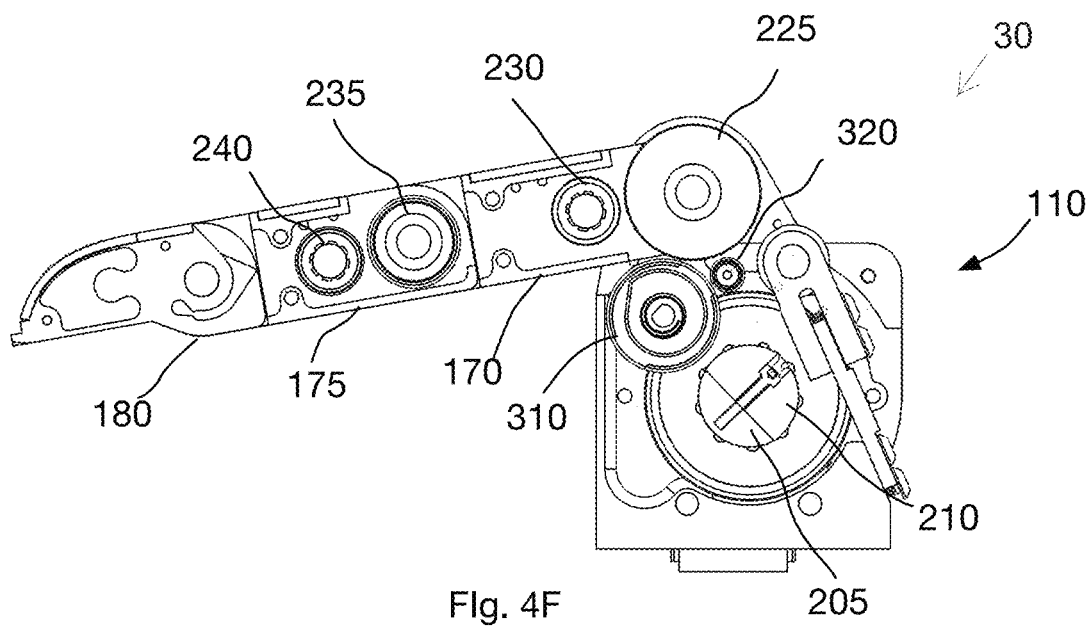
FIG. 4F is a side cross-sectional view of the finger assembly of FIG. 4A taken along the plane A-A', shown without a return cable installed.
Figure 4G:
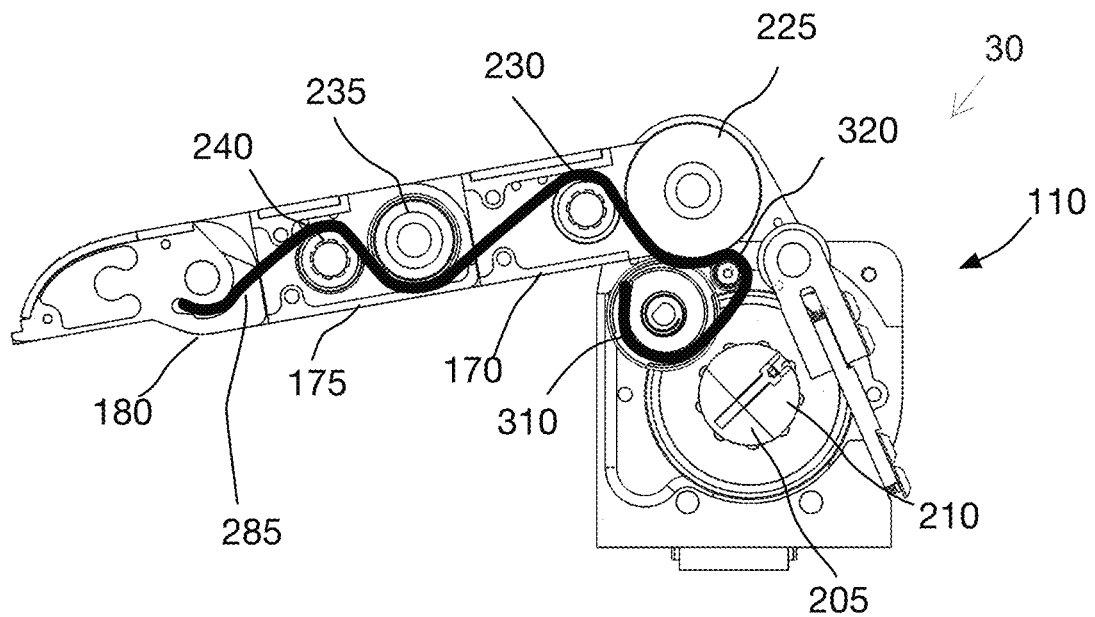
FIG. 4G is a side cross-sectional view of the finger assembly of FIG. 4A taken along the plane A-A', shown with a return cable installed.

Along with the driving cable 275, each finger assembly 30 may also include a return cable. FIG. 4F is a side cross-sectional view of the finger assembly of FIG. 4A taken along the plane A-A', shown without a return cable installed. FIG. 4G is a side cross-sectional view of the finger assembly of FIG. 4A taken along the plane A-A', shown with a return cable installed. The function and routing of the return cable 285 is now described with the help of FIGS. 4F-4G. FIG. 4F shows the pulleys and spring associated with the return cable 285 while FIG. 4G shows the return cable itself.

As can be seen in FIG. 4G, the return cable 285 terminates at a passive return spring 310. The return cable then passes around a portion of the idler pulley 320, below pulley 225, over pulley 230, under pulley 235, and over pulley 240, finally terminating at the distal link 180 via a smaller capstan effect with a dovetail grooved section. However, any other suitable means of terminating or otherwise securing the distal end of return cable 285 at the distal link 180. The additional holding force provided by the capstan effect of a cable wrapped around a structural feature may not be required in some embodiments, due to the reduced tension in the return cable 285 as compared to a driving cable 275 under maximum or high loading.

It can be seen by comparing FIG. 4C and FIG. 4G that the driving cable 275 and the return cable 285 travel in complementary directions within the links of the finger assembly around the pulleys 225, 230, 235, and 240. Thus these two cables exert forces in nominally opposite directions on the links 170, 175, and 180. The return cable 285 may not necessarily need to withstand as high a tension force as the driving cable 275. Thus in some embodiments the return cable may be round in cross-section, as a round cable of VECTRAN™ or a similar material of similar thickness to the driving cable 275 may in some embodiments be sufficient to sustain the required loading of the return cable 285.

However, the use of any other suitable cross-sectional shape or material for the return cable 285 is not excluded. The return cable 285 provides a uniform return force that returns the finger assembly 30 to a nominal position if the driving cable 275 does not exert force on the links 170, 175, and 180. The nominal position of the finger assembly may vary based on the orientation of the finger assembly due to the weight of the components of the finger assembly.

As the finger assembly 30 goes through its grasping motion, the magnitude of the return force increases from a nominal initial magnitude of the return force. In this example, the initial or nominal return force is 2 $lb_f$, however any other suitable magnitude of the initial return force may be used, and the properties of the passive return spring 310 may be used to define the initial return force. The initial return force prevents the finger assembly 30 from moving under the influence of gravity if the fingers were placed upside down in relation to the position of the fingers illustrated in FIGS. 4F-4G. In one example, the return force may reach a maximum of 8 $lb_f$ at maximum displacement of the finger assembly 30, but other magnitudes of maximum return force may be used.

With a configuration of driving and return cables, bearings, and pulleys, the position of the links of the finger assembly 30 may be controlled by controlling the motor 140. Rotations of the motor may be translated to rotations of the cap 205 and hub 210. As can be seen in FIG. 4B, rotation of the motor 140 which results in a clockwise rotation of the hub 210 may increase the tension in the driving cable 275. The increased tension in driving cable 275 may result in rotation of the links and initiation of the grasping process.

The specific manner in which the links rotate in response to increased tension in the driving cable 275 may be controlled in part by the design of the components along which the driving cable 275 passes. When a hand including fingers such as the finger assembly 30 begins the process of grasping an object, it may be advantageous to cause the proximal link 170 to rotate first, followed by the intermediate link 175, and followed finally by the distal link 180. This ordering may be advantageous as rotating the proximal link or links (of the other fingers) first until the one or multiple proximal links come in contact with the object being grasped provides the largest grasping surface area, without having the distal or medial link folding on themselves before grasping the object.

The ordering of the movement of links can be achieved by the choosing the diameter of the bearings and the lengths of the links appropriately. As can be seen in FIGS. 4B-4C, pulley 225 is larger in diameter than pulley 235, which in turn is larger than the curved feature 250. In particular, the diameter of the contact area of pulley 225 is larger in diameter than the diameter of the contact area of pulley 235. When the driving cable 275 is in tension, the entire length of the cable experiences substantially uniform tension. Thus, due to differences in the diameter, the pulleys experience varying magnitudes of rotational moments. These moments are then transferred to the respective links, which makes the links rotate about their rotational axis.

Thus in an embodiment such as the illustrated embodiment, where the pulley 225 of the proximal link 170 is the largest pulley or curved surface of any of the links, increasing tension in the driving cable 275 may cause the proximal link 170 to rotate more about pulley 225 than the links 175 and 180 will rotate about their respective pulleys. As the pulley 235 of medial link 175 may be the next largest pulley, the medial link 175 will then rotate more than distal link 180 once proximal link 170 reaches the end of its travel or when the proximal link 170 comes in contact with an object, such as an object the hand is trying to grasp. Then as the medial link 175 reaches the end of its travel or comes in contact with the object being grasped, increasing the tension in the driving cable 275 causes the distal link 180 to move until it reaches the end of its travel of comes into contact with an object. In this manner, the largest grasping area may be provided.

In one embodiment, with reference to FIG. 4B, the diameter of the contact areas of feature 250 and needle bearings 240 and 230 are 10 mm. The diameter of the contact areas of pulleys 235 and 225 are 16.5 mm and 22 mm, respectively. Also in this embodiment, the lengths of the distal link, medial link and the proximal links are 30 mm, 38 mm and 50 mm respectively. The values specified above provide an example of an embodiment in which large grasping force can be provided in an under-actuated package, but a wide variety of other dimensions may also be used.

Thus it may be seen that by controlling the rotation of a single motor 140, the motion of finger with multiple links may be controlled through an underactuated system using a system of cables. In addition, by measuring the tension in the appropriate cable, the forces applied to external objects in contact with the finger assembly 30 may be controlled. The electronics subsystem is now described.

Figure 4H:
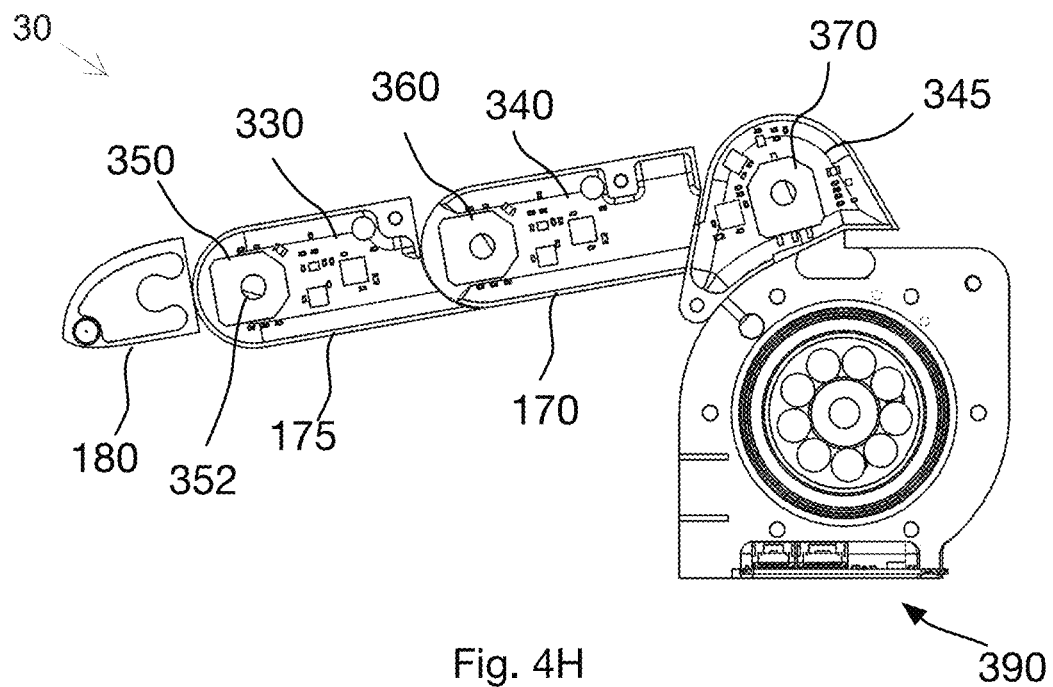
FIG. 4H is a side cross-sectional view of the finger assembly of FIG. 4A taken along the plane C-C', shown without electrical cables installed.
Figure 4I:
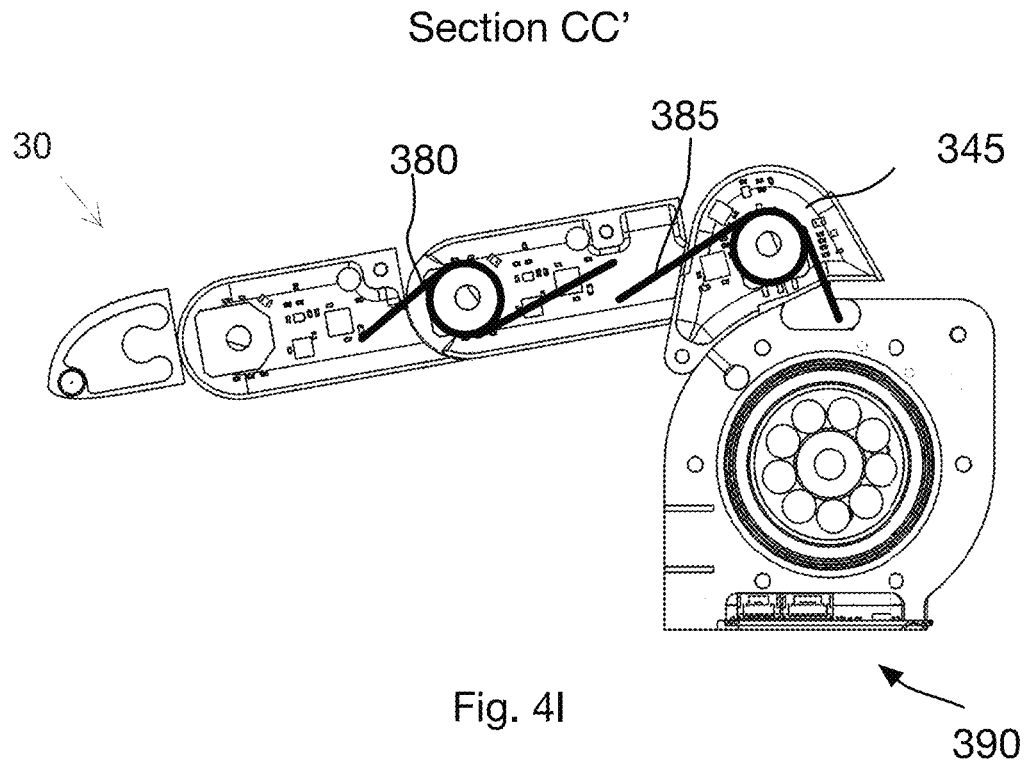
FIG. 4I is a side cross-sectional view of the finger assembly of FIG. 4A taken along the plane C-C', shown with electrical cables installed.

FIG. 4H is a side cross-sectional view of the finger assembly of FIG. 4A taken along the plane C-C', shown without electrical cables installed. FIG. 4I is a side cross-sectional view of the finger assembly of FIG. 4A taken along the plane C-C', shown with electrical cables installed.

As can be seen in FIGS. 4H-4I, the finger assembly 30 includes an electrical subsystem coupled to the links. The electrical subsystem includes a plurality of printed circuit boards (PCBs). In the illustrated embodiment, a PCB is located adjacent each of the joints in the finger assembly 30. A first PCB 345 is positioned within the finger base adjacent the joint between the proximal link and the finger base. A second PCB 340 is positioned within the proximal link 170 adjacent the joint between the proximal link 170 and the medial link 175. A third PCB 330 is positioned within the medial link 175 adjacent the joint between the distal link 180 and the medial link 175. Each of the PCBs 330, 340, and 345 is coupled to respective absolute angular position sensors or potentiometers 350, 360, and 370, respectively. The potentiometers 350, 360 and 370 have a feature such as feature 352 of potentiometer 350, which is configured to receive or otherwise engage with a portion of the shoulder 172 of a pin 171. In the illustrated embodiment, the feature 352 has a cross-sectional shape that is complementary with the non-cylindrical projection 174 extending from the outer end of the shoulder section 172 of pin 171. In other embodiments, any other suitable combination of shapes or other engagement mechanism can be used to cause the potentiometer feature to rotate along with the pin 171.

As the pins 171 rotate, the angular position of the pins can be measured as the potentiometer feature 152 rotates along with the pin 171. This can allow angular position sensor 370 to provide a measurement of the angular position of the proximal link 170. As the position center closes to the finger base, angular position sensor 370 may also be used as a base reference frame for the angular position of the other angular position sensors 360 and 350. Angular position sensor 360 may be used to measure the angular position of the medial link in relation to the proximal link and angular position sensor 350 may be used to measure the position of the distal link in relation to the medial link. With this combination of angular position sensors at each joint, the absolute angular position of each link of the finger may be measured.

In addition to the angular position sensors, each PCB 330, 340, and 345 may include other components not specifically illustrated herein, including but not limited to microcontrollers, LEDs, capacitors, and sensor interfaces. Power for the PCBs and signal and control pathways between the PCBs are provided through the electrical cables 380 and 385. In some embodiments, each electric cable may have three wires, one each for the power, ground and signal, although other wiring arrangements may also be used. In the illustrated embodiment, the cables are routed across the joint rotation point in order to pass the power and signals to each link. These cables 380 and 385 may be arranged in service loops as shown in FIG. 4I to prevent stress on the cables when the links rotate. The service loops may be formed by wrapping the electrical cables around features on the housing of the finger assembly.

This system of electrical cables 380 and 385 connecting PCBs 330, 340, and 345 forms a data bus through which data such as angular position data from each sensor can be communicated to other members coupled to the bus. However, a wide variety of alternative arrangements may also be used to route data and power throughout the finger assembly. In some embodiments, throughholes and/or flex cables may be used to route data and power throughout the finger assembly, although the formation of throughholes at the joints may make it more difficult for the finger assembly to withstand high loading. In another embodiment, the return cable 285 may carry power and signal information, and metal portions of the frame may serve as the return ground.

The electrical subsystem for each finger may also include a daughterboard that may contain an interface to route power, ground, control data and sensor data to a motherboard. Although the daughter board is not illustrated explicitly, one possible location of the daughter board is shown by arrow 390 in FIGS. 4H-4I.

In some embodiments, each finger is modular and the construction of the multiple fingers may be similar or identical. The daughter boards of each finger may all plug into or otherwise communicate with a motherboard that may be located at the bottom of the base assembly 20 of the hand (see FIG. 2). The daughter board may also route the power and control for the motor 140 and the other sensors such as the Hall effect sensors 150 through interface connectors to the motherboard. The motherboard (not shown in the figures) may include various components including but not limited to its own microcontroller, power source, and communication interface etc. The connections between the daughter boards and other components of the various finger assemblies allows coordination of the actions of the three fingers, if desired.

Figure 5:
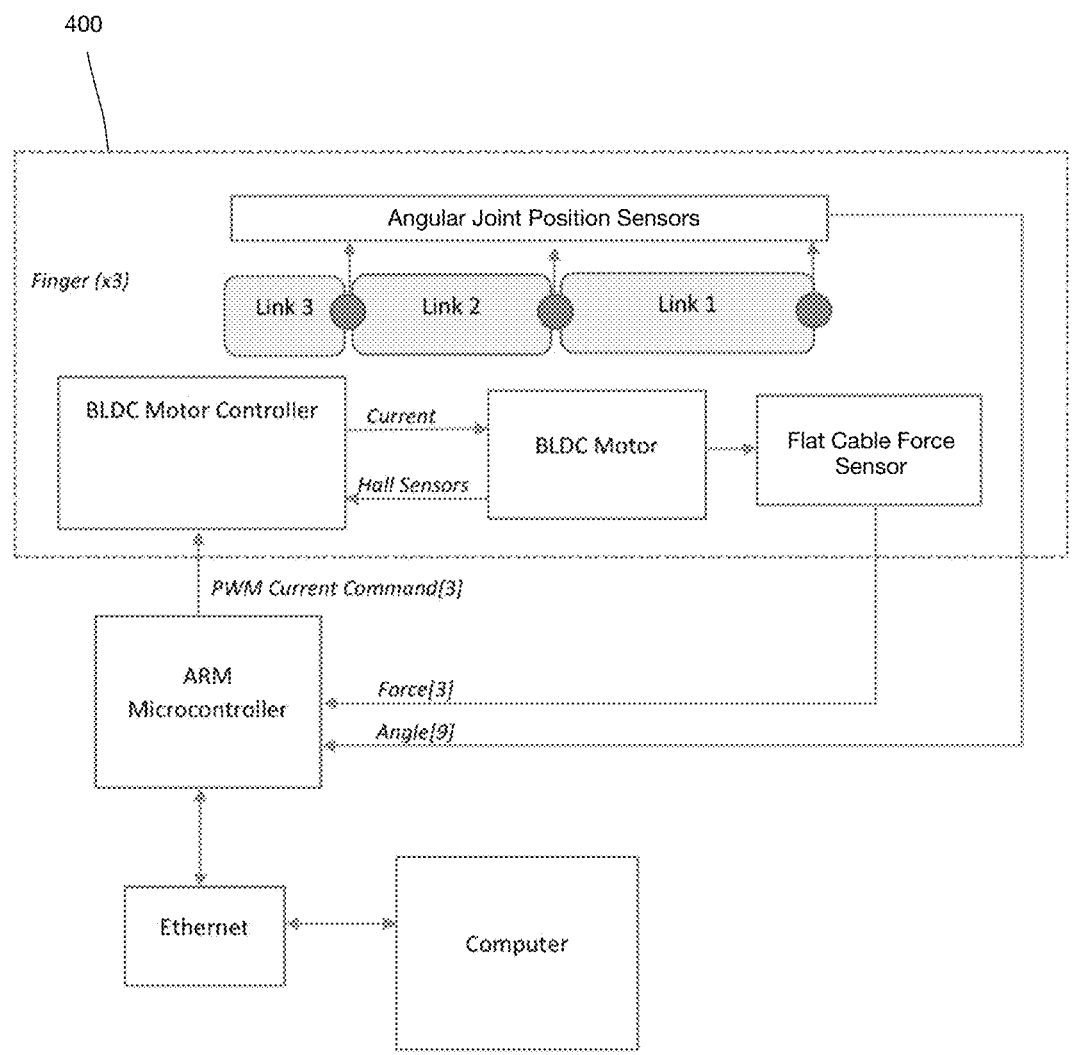
FIG. 5 is a block diagram which schematically illustrates an embodiment of the electrical architecture of a hand end effector system, including the control system.

FIG. 5 is a block diagram which schematically illustrates an embodiment of the electrical architecture of a hand end effector system, including the control system. In some embodiments, the components in the dashed box 400 are physically located within each finger assembly. In such embodiments, the finger assemblies may be modular, as discussed above. The components outside the dashed box may be located within the hand base assembly or elsewhere.

As explained earlier, each finger assembly may include a brushless DC motor that may be controlled by a suitable brushless DC motor controller, although other suitable motors may also be used. In addition, each finger assembly may include various sensors such as the Hall effect sensors to commutate the DC motor, the force sensor and the angular joint sensors coupled to each link. In the illustrated embodiment, Link1, Link2 and Link 3 in the figure refer to the proximal link, the medial link and the distal link, although greater or fewer numbers of links may be provided in other embodiments.

Outside box 400, a microcontroller, such as an ARM microcontroller, may coordinate the actions of the multiple fingers. Also as shown in the figure, the microcontroller may communicate via external computers via suitable communication interfaces, including wired or wireless connections. The exemplary system architecture illustrated in FIG. 5 may be used to control and coordinate one or multiple fingers of one or multiple robotic hands.

The concepts described in this disclosure, although described in terms of a robotic hand applying a wide range of grasping forces, may be generally applicable in various other situations within the field of robotics. As an example, the concepts may be applied to robot locomotion or more generally to develop and transmit large forces from one part of the robot to another using compact transmission systems.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. For example, electrical components/devices may be shown in block diagrams in order not to obscure the examples in unnecessary detail. In other instances, such components, other structures and techniques may be shown in detail to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A robotic end-effector, comprising:
   a base;

a first appendage extending from the base, the first appendage comprising:
a first appendage link coupled to the housing at a first joint;
a first joint pulley rotationally coupled to the first joint, the first joint pulley comprising a contact section having a first outer diameter;
a second appendage link coupled to the first appendage link by a second joint;
a second joint pulley rotationally coupled to the second joint, the second joint pulley comprising a contact section having a second outer diameter different than the first outer diameter of the contact section of the first joint pulley;
a motor disposed within the base;
a hub disposed within the base and rotationally coupled to the motor; and
a driving cable coupled to the hub at a first end and coupled to the first appendage at a second end, the driving cable in contact with the contact sections of the first joint pulley and the second joint pulley such that rotation of the hub alters a tension in the driving cable and induces rotation of at least one of the first or second appendage links; and
a tension sensing structure biased against a portion of the driving cable extending between the hub and the first joint and having a position dependent upon the tension in the portion of the driving cable extending between the hub and the first joint.

2. The end-effector of claim 1, additionally comprising a first intermediate pulley disposed within the first appendage link and between the first and second joint pulleys, wherein the driving cable is wound in order along alternating sides of the first joint pulley, first intermediate pulley, and second joint pulley.

3. The end-effector of claim 2, additionally comprising a return cable secured at a first end within the base and at a second end within the first appendage, wherein the return cable is wound in order around alternating sides of the first joint pulley, first intermediate pulley, and second joint pulley on the opposite side as the driving cable.

4. The end-effector of claim 2, wherein the first joint pulley is supported by a pair of angular bearings, and wherein the first intermediate pulley is supported by a needle bearing.

5. The end-effector of claim 1, wherein the first appendage further comprises:
a third appendage link coupled to the second appendage link by a third joint; and
a third joint pulley rotationally coupled to the third joint, the third joint pulley comprising a contact section having a third outer diameter different than the first outer diameter of the exterior contact section of the first joint pulley and the second outer diameter of the exterior contact section of the second joint pulley, wherein the driving cable is in contact with the contact area of the third joint pulley.

6. The end-effector of claim 1, additionally comprising:
a second appendage extending from the base, the second appendage comprising:
a first appendage link coupled to the housing at a first joint;
a first joint pulley rotationally coupled to the first joint, the first joint pulley comprising a contact section having a first outer diameter;
a second appendage link coupled to the first appendage link by a second joint;
a second joint pulley rotationally coupled to the second joint, the second joint pulley comprising a contact section having a second outer diameter different than the first outer diameter of the contact section of the first joint pulley;
a motor disposed within the base;
a second hub disposed within the base and rotationally coupled to the motor; and
a second driving cable coupled to the second hub at a first end and coupled to the first appendage at a second end, the second driving cable in contact with the contact sections of the first joint pulley and the second joint pulley of the second appendage such that rotation of the second hub alters the tension in the second driving cable and induces rotation of at least one of the first or second appendage links of the second appendage.

7. The end-effector of claim 6, wherein the driving cable is wound at least one complete rotation about the hub.

8. The end-effector of claim 1, wherein the driving cable has a non-circular cross section.

9. The end-effector of claim 1, additionally comprising a position sensor located adjacent the first joint, wherein the first joint comprises a first pin configured to engage the position sensor.

10. The end-effector of claim 1, wherein the driving cable comprises a material having a self-support length of at least 50 km.

11. The end-effector of claim 1, wherein the driving cable is capable of bearing a tensile load of at least 50 $lb_f$.

12. The end-effector of claim 11, wherein the driving cable is capable of bearing a tensile load of at least 150 $lb_f$.

13. A robotic finger assembly, comprising:
a proximal appendage link configured to rotate about a first joint;
a first joint pulley coupled to the first joint and having a first outer diameter;
a distal appendage link coupled to the proximal link by a second joint;
a second joint pulley coupled to the second joint and having a second outer diameter different than the first outer diameter of the first joint pulley;
a motor; and
a driving cable coupled to the motor and in contact with contact sections of the first joint pulley and the second joint pulley such that rotation of a hub alters the tension in the driving cable and induces rotation of at least one of; and
a tension sensing structure biased against a portion of the driving cable extending between the hub and the first joint and having a position dependent upon the tension in the portion of the driving cable extending between the hub and the first joint.

14. The assembly of claim 13, wherein the driving cable has a non-circular cross section.

15. The assembly of claim 13, additionally comprising a hub coupled to the motor, wherein a first end of the driving cable is frictionally retained within the hub, and wherein the driving cable is wrapped at least one full revolution around the circumference of the hub.

16. The assembly of claim 13, additionally comprising:
a load sensor; and
a sensor pulley coupled to the load sensor and in contact with the driving cable, wherein changes in the tension of the driving cable induce deflection of the sensor pulley.

17. The assembly of claim 13, additionally comprising an absolute position sensor disposed adjacent each of the first joint and the second joint.

18. The assembly of claim 13, additionally comprising a return cable extending from a return spring and through at least the first and second appendage links, the return cable extending along the opposite sides of the first and second joint pulleys of the driving cable.

19. A robotic hand end-effector, comprising:
- a base;
- a plurality of appendages, each appendage comprising a plurality of appendage segments, each appendage segment configured to rotate relative to a joint located at the proximal end of the appendage segment;
- a plurality of motors disposed within the base; and
- a plurality of driving cables, each driving cable connected to a motor and routed through the plurality of appendage segments of an appendage and configured to induce rotation of each of the plurality of appendage segments in response to a change in tension of the; and
- a tension sensing structure biased against a portion of the driving cable extending between the hub and the first joint and having a position dependent upon the tension in the portion of the driving cable extending between the hub and the first joint.

20. The end-effector of claim 19, wherein each joint in an appendage is coupled to a joint pulley, the diameter of the joint pulleys in an appendage decreasing with increased distance from the base.

21. The end-effector of claim 20, wherein the appendage comprises:
- a proximal appendage segment connected to the base by a first joint coupled to a first joint pulley having a first diameter;
- a medial appendage segment connected to the proximal appendage segment by a second joint coupled to a second joint pulley having a second diameter smaller than the first diameter of the first joint pulley; and
- a distal appendage segment connected to the medial appendage segment by a third joint coupled to a third joint pulley having a third diameter smaller than the second diameter of the second joint pulley.

22. The end-effector of claim 21, additionally comprising:
- a first needle bearing disposed within the proximal appendage segment; and
- a second needle bearing disposed within the medial appendage segment.

23. The end-effector of claim 22, wherein the driving cable is wound in a serpentine manner past, in turn, the first joint pulley, the first needle bearing, the second joint pulley, the second needle bearing, and the third joint pulley, and wherein the distal end of the driving cable is secured within the distal appendage segment.

24. The end-effector of claim 19, wherein at least one of the plurality of appendages is an underactuated appendage.

* * * * *